United States Patent Office.

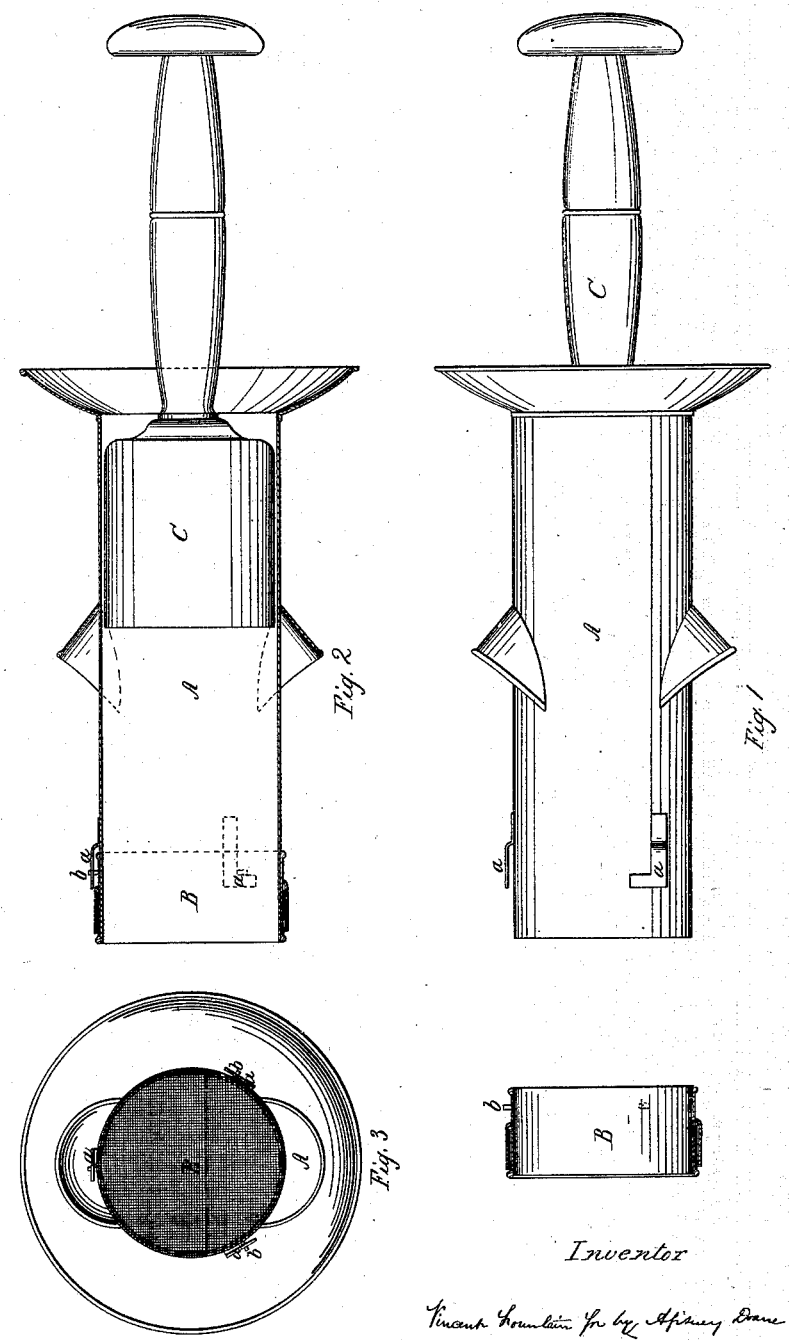

IMPROVED POTATO MASHER.

VINCENT FOUNTAIN, JR., CASTLETON, NEW YORK.

Letters Patent No. 60,355, dated December 11, 1866.

The Schedule referred to in these Letters Patent and making part of the same.

TO ALL WHOM IT MAY CONCERN:

Be it known that I, VINCENT FOUNTAIN, Jr., of Castleton, Richmond county, New York, have invented, made, and applied to use a new and useful Potato Masher; and I do declare the following to be a full, clear, and correct description thereof, reference being had to the accompanying drawings, making part of this specification, and to the letters of reference marked thereon, in which—

Figure 1, a front view of my improved potato masher.
Figure 2, a sectional view of the same.
Figure 3, an end view of the same.

In the drawings like parts of the invention are pointed out by the same letters of reference.

The nature of my invention consists in the construction and operation of a potato masher, as more fully hereinafter set forth, to enable those skilled in the arts to make and use my invention, I will proceed to describe the same.

A shows a tubular receptacle in which the potatoes to be mashed are placed. This receptacle may be made of tin or any suitable material, and is provided with the ears, $a$, to hold the removable bottom, B, in position. B shows the bottom formed of a ring made from metal or other suitable material, and a bottom formed of wire cloth or any proper material. This bottom, B, is provided with pins, $b$, which, when the bottom is placed upon the lower end of the receptacle, A, fit snugly beneath the ears, $a$, thus retaining the bottom, B, in position. C shows the masher formed of hard wood, and in construction like unto the masher usually employed. This masher is made sufficiently large to fit nicely into receptacle, A, and yet be freely moved within the same. My improved masher being thus constructed, the potatoes to be mashed are placed in the receptacle, A, and the masher, C, is moved freely up and down within the same, and the potatoes are thus mashed, the water from the same, passing off through the wire bottom, B. When desired to remove the potatoes, the bottom, B, is removed from the receptacle, A, and the potatoes may be pressed out of the receptacle, A.

Having thus described my invention, what I claim as new, and desire to secure by Letters Patent, is—

I claim as a new article of manufacture, a potato masher, constructed as described, to wit, the cylinder or tubular receptacle A, provided with the detachable perforated bottom B, and handles, one on each side, and the plunger C, all as shown and set forth.

VINCENT FOUNTAIN, JR.

Witnesses:
A. SIDNEY DOANE.
R. TURNER.